March 30, 1948.     C. V. BOOTH     2,438,533
EXPANSION STUD AND KEEPER ELEMENT COMBINATION
Filed March 2, 1946
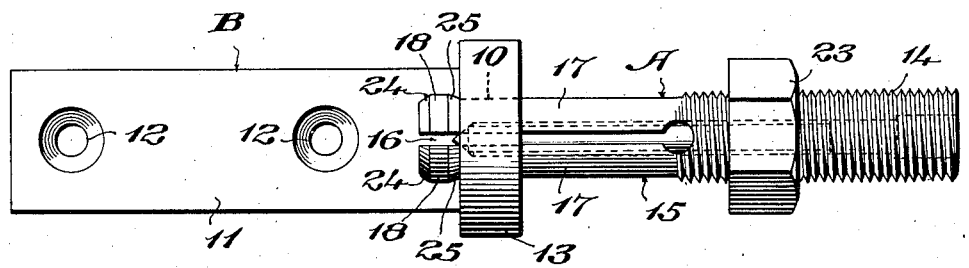
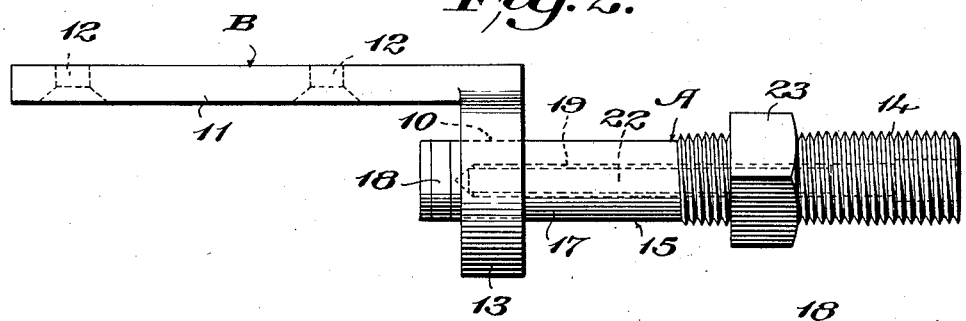
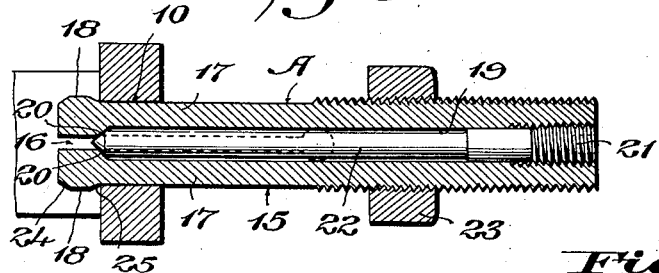
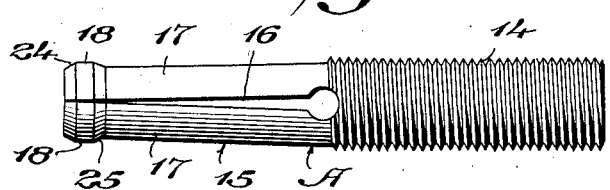
Inventor
C. V. Booth, Patented Mar. 30, 1948

2,438,533

UNITED STATES PATENT OFFICE 2,438,533

EXPANSION STUD AND KEEPER ELEMENT COMBINATION

Clarence V. Booth, Lakewood, N. J.

Application March 2, 1946, Serial No. 651,584

1 Claim. (Cl. 85—6)

This invention relates to an expansion stud and keeper element combination, and has for its primary object to provide, on the one hand, a keeper element which may be securely fastened to a structure wherein it is impracticable to form a hole to accommodate an ordinary expansion stud or bolt, or to which it is impracticable otherwise to attach an ordinary expansion stud or bolt, and, on the other hand, to provide an expansion stud of novel design adapting it to be securely locked to said keeper element to afford a practical means of securely fastening any desired element to the structure.

According to the invention, the keeper element is in the form of a bracket to be fastened by screws, bolts or the like to a structure and has therein a hole to accommodate the expansion stud, and in this connection a special and important object of the invention is to provide an expansion stud of novel design adapting it readily to be inserted into said hole and securely locked therein and equally as readily removed therefrom whenever desired.

With the foregoing and other objects in view, which will become more fully apparent as the nature of the invention is better understood, the same consists in an expansion stud and keeper element combination embodying the novel features of construction, combination and arrangement of parts as will be hereinafter more fully described, illustrated in the accompanying drawings, and defined in the appended claim.

In the accompanying drawings, wherein like characters of reference denote corresponding parts in the different views:

Figure 1 is a front elevation of an expansion stud and keeper element combination embodying the features of the invention.

Figure 2 is a plan view of the combination.

Figure 3 is a longitudinal section through the combination.

Figure 4 is an end elevation of the stud.

Figure 5 is a cross section through the stud looking toward the inner end thereof; and Figure 6 is a side elevation of a stud of alternative form.

Referring to the drawings in detail, A designates, generally, an expansion stud and B designates, generally, a keeper element, both constructed in accordance with the invention, for cooperation with each other.

The keeper element B is intended to be fastened to any structure and to have the stud A fastened thereto, and to this end it is provided with a hole 10 to accommodate said stud and is of a design such that when it is fastened to a structure its hole 10 is appropriately disposed to receive said stud. In this connection and as illustrated in the present instance, said element comprises a base portion 11 having holes 12 therein adapting it to be fastened by screws, bolts or the like to a structure, and an ear 13 extending forwardly from one end of said base portion and having therein the hole 10. Thus, when the base portion 11 is fastened, for example, flatly against a structure, the ear 13 projects from the structure and its hole 10 thereby is disposed to receive the stud A. Said element is formed from metal and is strong and sturdy.

The stud A may be of any desired length and preferably is of circular shape in cross section. Its outer end portion is externally threaded, as indicated at 14, and may be of the same or greater or lesser diameter than its inner end portion 15 which preferably is of a diameter to fit neatly into the hole 10 of the keeper element B.

The inner end portion 15 is divided by a diametrical slot 16 into two arms 17, 17 of suitable lengths which are resilient and adapted to be sprung together, and at the inner ends of these arms are exterior lugs 18, 18, respectively, of such depths and shapes that the inner end of the portion 15 may be passed through the hole 10 when said arms 17, 17 are sprung together. Preferably the lugs 18, 18 are of crescent shape in end elevation and are of maximum depth in a plane at right angles to the slot 16 and merge into the portion 15 at the sides of said slot. In any event, the construction in this respect is such that when the arms 17, 17 are sprung together, the portion 15 may be entered into and passed through the hole 10, and when said arms are held sprung apart the lugs 18, 18 prevent said portion 15 from being withdrawn from said hole 10.

The arms 17, 17 may normally be sprung apart, as illustrated in Figures 1 to 5, in which event it is necessary to spring them together in order to permit the inner end portion 15 to be entered into and passed through the hole 10. Alternatively, said arms may normally be closed relative to each other, as shown in Figure 6, in which event the portion 15 may readily be entered into and withdrawn from the hole 10, but will require springing apart of said arms in order to lock said portion in the hole 10 against the possibility of its withdrawal therefrom.

The stud A is provided with an axial bore 19 which extends from the outer end of said stud to a point near the inner end thereof where it terminates in end wall portions 20, 20 which are individual to the arms 17, 17 and which preferably taper toward the inner end of the stud. At its outer end the bore 19 is screw threaded to adapt the same to receive a screw 21.

In the bore 19 is a pin 22 which preferably is tapered at its inner end for wedging cooperation with the inner end wall portions 20, 20 of said bore and which is engageable at its outer end by the screw 21 whereby it may be forced inwardly by said screw to wedge the arms 17, 17 apart and to hold them against relative inward movement. The pin 22 may be of substantially the same diameter as the bore 19, but in that event it would be necessary to remove the screw 21 and to considerably withdraw said pin to permit the arms 17, 17 to be sprung together. Preferably, therefore, the inner end portion at least of said pin is of sufficiently lesser diameter than said bore so that merely by loosening the screw 21 a small amount the arms 17, 17 may be sprung together even though both said screw and said pin remain in the bore 19.

In using the combination, the bracket B first is fastened to a structure of any kind to which it is desired to secure the stud A for the purpose of utilizing the latter to fasten any desired element to the structure. With the screw 21 loosened to permit the arms 17, 17 to be sprung together if they are not normally in their closed relationship to each other as shown in Figure 6, the inner end portion 15 of the stud then is passed through the hole 10 to dispose the lugs 18, 18 at the far side of the ear 13. The screw 21 then is tightened to force the pin 22 inwardly and thus urge the arms 17, 17 apart to expand the stud firmly into the hole 10. Any possibility of the stud being withdrawn from the hole 10 is then positively prevented by the lugs 18, 18 and as a consequence the stud is firmly anchored to the structure for use in fastening any desired element to the latter through the instrumentality of a nut 23 threaded on the outer end portion of the stud. However, should it be desired at any time to remove the stud A, this may readily be done simply by loosening the screw 22 to permit the arms 17, 17 to be sprung together or to spring together, depending upon whether the stud is of the form shown in Figures 1 to 5 or in Figure 6.

To facilitate entering of the inner end of the stud into the hole 10, the inner end portions of the lugs 18 may be beveled as indicated at 24. Similarly, the outer end portions of said lugs may be beveled as indicated at 25 to facilitate removal of the stud from the opening 10 when the screw 22 is loosened.

Obviously, the present combination is especially useful in many instances where it is impracticable or impossible to use an ordinary expansion bolt. Moreover, the present combination has the advantage that the studs A may readily be removed from subsequent re-use when they have served their purpose in any prior use.

From the foregoing description considered in connection with the accompanying drawings, it is believed that the construction and operation of the present combination will be clearly understood and its advantages appreciated. It is desired to point out, however, that while only certain specific structural embodiments of the invention have been illustrated and described, the same is readily capable of specifically different structural embodiments within its spirit and scope as defined in the appended claim.

I claim:

In combination, a keeper element to be fastened to a structure, said element having therein a hole to receive an expansion stud, an expansion stud insertable through said hole, the inner end portion of said stud being slotted and thereby divided into a plurality of resilient arms, said stud having an axial bore extending from its outer end to a point near its inner end, a pin disposed in said bore, a screw threaded in the outer end portion of said bore for forcing said pin inwardly, the inner end of said pin being effective by engagement with the walls defining the inner end of said bore to spread said arms apart when said pin is forced inwardly by said screw, and exterior lugs on the inner end portion of said arms, the inner end portions of said arms being insertable through the hole in said bracket when said arms are contracted relative to each other, said lugs being effective to positively prevent withdrawal of the inner end portion of said stud from said hole when said arms are spread by said pin and screw substantially tightly into said hole, said pin and screw being disposed entirely within the end limits of said stud when the latter is fastened to said keeper element.

CLARENCE V. BOOTH.

REFERENCES CITED

The following references are of record in the file of this patent:

UNITED STATES PATENTS

| Number | Name | Date |
|---|---|---|
| 519,172 | Calkins | May 1, 1894 |
| 534,331 | Hodgson | Feb. 19, 1895 |
| 748,078 | Kaisling | Dec. 29, 1903 |
| 2,350,630 | Melcher | June 6, 1944 |